(12) United States Patent
Klein

(10) Patent No.: US 6,425,041 B1
(45) Date of Patent: *Jul. 23, 2002

(54) TIME-MULTIPLEXED MULTI-SPEED BUS

(75) Inventor: Dean A. Klein, Eagle, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/092,586

(22) Filed: Jun. 5, 1998

(51) Int. Cl.[7] ............................................... G06F 13/00
(52) U.S. Cl. ....................................... 710/306; 713/501
(58) Field of Search .................................. 710/100, 306, 710/307; 713/501

(56) References Cited

U.S. PATENT DOCUMENTS

| | | | |
|---|---|---|---|
| 4,697,262 A | * 9/1987 | Segal et al. | |
| 4,851,990 A | 7/1989 | Johnson et al. | 364/200 |
| 5,263,172 A | * 11/1993 | Olnowich | |
| 5,392,422 A | 2/1995 | Hoel et al. | 395/550 |
| 5,809,291 A | 9/1998 | Munoz-Bustamante et al. | 395/556 |
| 5,958,033 A | * 9/1999 | Schubert et al. | 710/126 |
| 6,012,116 A | 1/2000 | Aybay et al. | 710/113 |
| 6,134,621 A | * 10/2000 | Kelley et al. | 710/126 |
| 6,173,349 B1 | 1/2001 | Qureshi et al. | 710/110 |

* cited by examiner

*Primary Examiner*—Paul R. Myers
(74) *Attorney, Agent, or Firm*—Dorsey & Whitney LLP

(57) ABSTRACT

A time-multiplexed multi-speed bus that comprises a combination of a low-speed communications bus and a high-speed communications bus into a single communications bus that supports both low-speed and high-speed operations. The time-multiplexed multi-speed bus contains a low-speed state machine and a high-speed state machine. The time-multiplexed multi-speed bus is controlled by the low-speed state machine and operated at low speed in order to conduct transactions between two low-speed peripheral devices, and is controlled by the high-speed state machine and operated at high speed in order to conduct transactions between and two high-speed peripheral devices. For transactions between peripheral devices having different speeds, either a buffer is used to store data between data transmission and data reception by the two devices, or the low-speed and high-speed state machines are synchronized and operationally interleaved.

35 Claims, 3 Drawing Sheets

US 6,425,041 B1

TIME-MULTIPLEXED MULTI-SPEED BUS

TECHNICAL FIELD

The present invention relates to bus communication pathways and, in particular, to a time-multiplexed multi-speed bus that supports both low-speed bus operations and high-speed bus operations.

BACKGROUND OF THE INVENTION

A bus is a communication pathway that connects two or more devices within a computer system. A bus is a shared transmission medium to which multiple devices can be connected. A signal transmitted by one device may be received by any other device attached to the bus, or even by multiple devices attached to the bus. A bus may contain from 8 to greater than 100 separate signal lines. At any given instant of time, each signal line is assigned to a particular meaning or function. The signal lines can be broadly classified into the following three groups: data lines, address lines, and control lines, although some signal lines time multiplex various combinations of these groups.

The data lines are used to move data from one device to another over the bus. Each data line corresponds to one bit of data. Generally, a bus contains some multiple of 8 data lines with each data line representing one bit of an 8-bit byte. The number of data lines contained in a bus is referred to as the width of the bus. Modern buses may contain 32, 64, 128, or a greater number of data lines. In addition, one or more error detecting or error correcting bits may be transferred on respective signal lines of a bus.

Address lines are used to identify the source or destination of a subsequent data transfer operation. Each device connected to a bus generally has a unique address that can be transmitted through the address lines to notify the device that it is the intended recipient of a following data transfer. As with the data lines, a bus generally contains some multiple of 8 address lines, although an error detecting bit, such as a parity bit, may be included. Common computer architectures use 16, 32, or 64-bit addresses.

Control lines are used by devices to specify operations like, for example, reading data and writing data, as well as for synchronizing access to the bus and for receiving notification of the reception and transmission of data. Certain control lines are shared by multiple devices, while other control lines are dedicated to specific devices.

One special control line is the clock signal line. Bus operations occur over one or more bus cycles. Each bus cycle is composed of one or more clock cycles. In normal operation, the clock signal line rapidly and regularly oscillates between a high state and a low state. One complete oscillation of the clock signal line represents one clock cycle. In a low-speed bus, the clock signal line oscillates with a relatively low frequency, like, for example, 33 megahertz. In a high-speed bus, the clock signal line oscillates with a relatively high frequency of 66 megahertz or 133 megahertz. However, the frequency of the clock signal may be reduced to reduce power consumption, particularly in battery powered portable computers.

A high-speed bus can complete a greater number of bus cycles in a given amount of time, and can thus execute a greater number of bus operations in a given amount of time, than a low-speed bus. A greater number of bus operations per unit of time corresponds to a greater data transfer rate, or bandwidth.

Modem computer systems, such as personal computers ("PCs"), employ a number of different buses that are often hierarchically organized. Using multiple buses, a computer architect is able to isolate certain high volume or time critical data exchanges between particular devices from lower volume or less critical data exchanges, respectively. FIG. 1 is a block diagram of a commonly-employed bus architecture within a currently-available PC 100. The various buses within the PC provide communication pathways between a central processing unit ("CPU") 102, one or more main memories 104, several low-speed devices 106, such as storage or networking devices, a high-speed device 108, such as a gigabit local area network controller or a high-speed graphics device controller, and low-speed devices (not shown), such as a keyboard, mouse, printer or serial port, through a peripheral I/O port 113, such as an Ultra Port manufactured by National Semiconductor, connected to another low-speed bus 110 through a bus bridge 112. A system controller 114 serves within the PC 100 as a sort of terminal and transfer station for a number of important buses. The CPU 102 is connected to the system controller 114 via a CPU bus 116. Main memory 104 is connected to the system controller 114 via a memory bus 118. One or more low-speed devices 106 and the bus bridge 112 are generally connected to the system controller 114 via a 33 megahertz peripheral component interconnect ("PCI") bus 120. High speed devices 108 are commonly connected to the system controller via a 66 megahertz PCI bus or a 133 megahertz advanced graphics processor ("AGP") bus 121. The AGP bus is both a functional and physical superset of the PCI bus.

Buses are connected to the system controller 114 through a collection of pin connectors and logic circuits that together compose a bus interface. The system controller 114 shown in FIG. 1 contains, for example, a CPU bus interface 122, a memory bus interface 124, a low-speed PCI bus interface 126, and a high-speed PCI bus or AGP bus interface 128. The connection interfaces of the system controller 114 and of other integrated circuit devices (not shown) comprise a large number of terminals, including the terminals of the bus interfaces. These terminals are most commonly pin connectors positioned along the sides of packaging for the integrated circuit, but they may also have other forms, such as terminal pads adapted to be mounted on a printed circuit board using a ball grid array. The density of terminals, such as connector pins positioned along the edges of such devices, is a critical limiting factor in the design of modern computer systems. A device that supports an increased functional interface generally requires an increased number of terminals. Increasing the number of terminals, however, adds to the expense and detracts from the reliability of a device, and there are practical limits to the number of terminals that can be incorporated into a given device. While a larger number of terminals can be accommodated by making the package for the integrated circuit larger, doing so requires signals coupled to and from the integrated circuit over a longer signal path. Increasing the length of the signal paths may create internal timing problems and it limits the operating speed of the integrated circuit.

As the width of buses has increased from 16 to 32, and now, commonly, to 64, the number of terminals that comprise a bus interface has also correspondingly increased. In order to minimize the number of terminals required for a bus interface, bus architects have developed a strategy known as time multiplexing. Using this strategy, bus architects are able to use the same physical signal lines both for data transfer and for addressing. In other words, the data lines and the address lines are physically coexistent. Certain of the control lines on the bus can be asserted within a bus cycle to select either an addressing mode or a data transfer mode for bus operation. At any particular instant of time, the data/address signal lines are used either for data transfer or for addressing. At the cost of the addition of several control lines for controlling the selection of either a data transfer mode or an addressing mode, 16, 32, or 64 signal lines that would otherwise be dedicated solely for addressing or for data transfer can be eliminated. Time multiplexing thus provides a way to decrease the number of physical signal lines required to implement a bus and to correspondingly decrease the number of terminals required for the bus interface.

In FIG. 1, the low-speed bus 120 and the high-speed bus 121 are shown to be comprised of both broad sets of signal lines 130 and 132 and narrow sets of signal lines 134 and 136. The broad sets of signal lines 130 and 132 include the shared data/address lines and a majority of the control lines. The narrow sets of signal lines 134 and 136 include a small number of control lines related to control of the bus cycles.

Although use of time multiplexing has enabled computer architects to control the number of terminals required for a particular bus interface, increasing demands for bandwidth and connectivity within computer systems has resulted in the use of an increasing number of different buses. Modern high-speed graphics devices, for example, require rapid transmission of a very high volume of data and therefore require high-speed buses such as the 66 megahertz PCI bus or the 133 megahertz AGP bus. Thus, as shown in FIG. 1, a low-speed bus 120 and a high-speed bus 121 are both needed to provide the bandwidth requirements for the increasing number of low-speed peripheral devices and the high-speed graphics devices commonly required in a modem PC. Many of the low-speed devices cannot be connected to a high-speed bus such as a 66 megahertz PCI bus or a 133 megahertz AGP bus, because the high-speed bus cannot tolerate large capacitive loads. Each additional bus interface requires additional pin connectors that increase the expense and decrease the reliability of the devices that contain them. The Intel 440LX bus bridge, for example, currently requires 492 pin connectors to support 4 buses, including a 32-bit PCI bus and a 32-bit AGP bus. An increase of the width of the PCI and AGP buses to 64 bits will correspondingly increase the number of pin connectors required in the Intel 440LX bus bridge and similar devices. A need has therefore been recognized for a device that incorporates both low-speed and high-speed bus interfaces while, at the same time, minimizes the number of pin connectors that need to be added to the device.

SUMMARY OF THE INVENTION

One embodiment of the present invention in a computer provides a multiplexed multi-speed bus that supports low-speed bus operations and high-speed bus operations over shared time-multiplexed control, data and address signal lines. In this embodiment, both low-speed peripheral devices and high-speed peripheral devices are connected to a single set of data and address signal lines. The low-speed peripheral devices are separately connected, in addition, to a small set of dedicated low-speed control lines. Similarly, the high-speed peripheral devices are separately connected to a small set of dedicated high-speed control lines. Bus cycles are controlled during high-speed operation of the bus by the high-speed control lines, and are controlled during low-speed operation of the bus by the low-speed control lines. When a bus operation is initiated by or directed to a low-speed peripheral device, the bus is operated at low speed. When a bus operation is initiated by or directed to a high-speed peripheral device, the bus is operated at high speed. Bus operations involving both a low-speed and a high-speed peripheral device are initially at the speed of the peripheral device transmitting data to a storage buffer (not shown) in the system controller 114. The system controller 114 then transmits the data from the storage buffer to the peripheral device receiving the data at the speed of the receiving peripheral device. Thus, in this embodiment of the present invention, two different levels of time multiplexing are employed. At one level of time multiplexing, both data and addresses are transmitted over a common set of signal lines. At a second level of time multiplexing, both low-speed and high-speed bus operations are conducted over the shared data and address signal lines. This embodiment of the present invention essentially combines two different physical buses into a single physical bus and two corresponding bus interfaces into a single bus interface that requires far less terminals than the sum of the terminals required for the two separate bus interfaces.

DETAILED DESCRIPTION OF THE INVENTION

The present invention provides a time-multiplexed multi-speed bus that supports low-speed bus operations and high-speed bus operations over the data/address lines and a majority of the control lines of a single physical bus. The present invention can be alternatively viewed as the combination of a low-speed bus and a high-speed bus together into a single bus that supports both low-speed and high-speed peripheral devices. The single physical bus that represents a combination of a low-speed and a high-speed bus contains a single set of data/address lines and a single set of most of the control lines as well as a small number of dedicated low-speed bus cycle control signal lines and an equal number of dedicated high-speed bus cycle control lines. The bus interface for the combined low-speed and high-speed bus includes an arbiter that ensures that low-speed bus operations do not interfere with high-speed bus operations, as well as a low-speed state machine that sequences signals propagated during low-speed operations and a high-speed state machine that sequences signals propagated during high-speed operations. The bus interface may include separate data and address buffers for low-speed and high-speed operations or may include a single data buffer and a single address buffer that are shared between low-speed and high-speed operations. Transmission of data between low-speed and high-speed devices may be accomplished by operating the bus at one speed to obtain the data from one device, buffering the obtained data within the bus interface, and operating the bus at a different speed in order to transmit the buffered data to the second device. Alternatively, the low-speed and high-speed state machines may be synchronized to allow transmission of data between low-speed and high-speed devices without using data buffering.

The embodiment discussed below relates to the combination of a low-speed PCI bus with either a high-speed PCI bus or a high-speed AGP bus within a PC. The principle of time multiplexing low-speed and high-speed buses within a single physical bus can, however, be implemented using a large variety of buses and can be implemented in any number of different types of computer systems.

Figure 1:
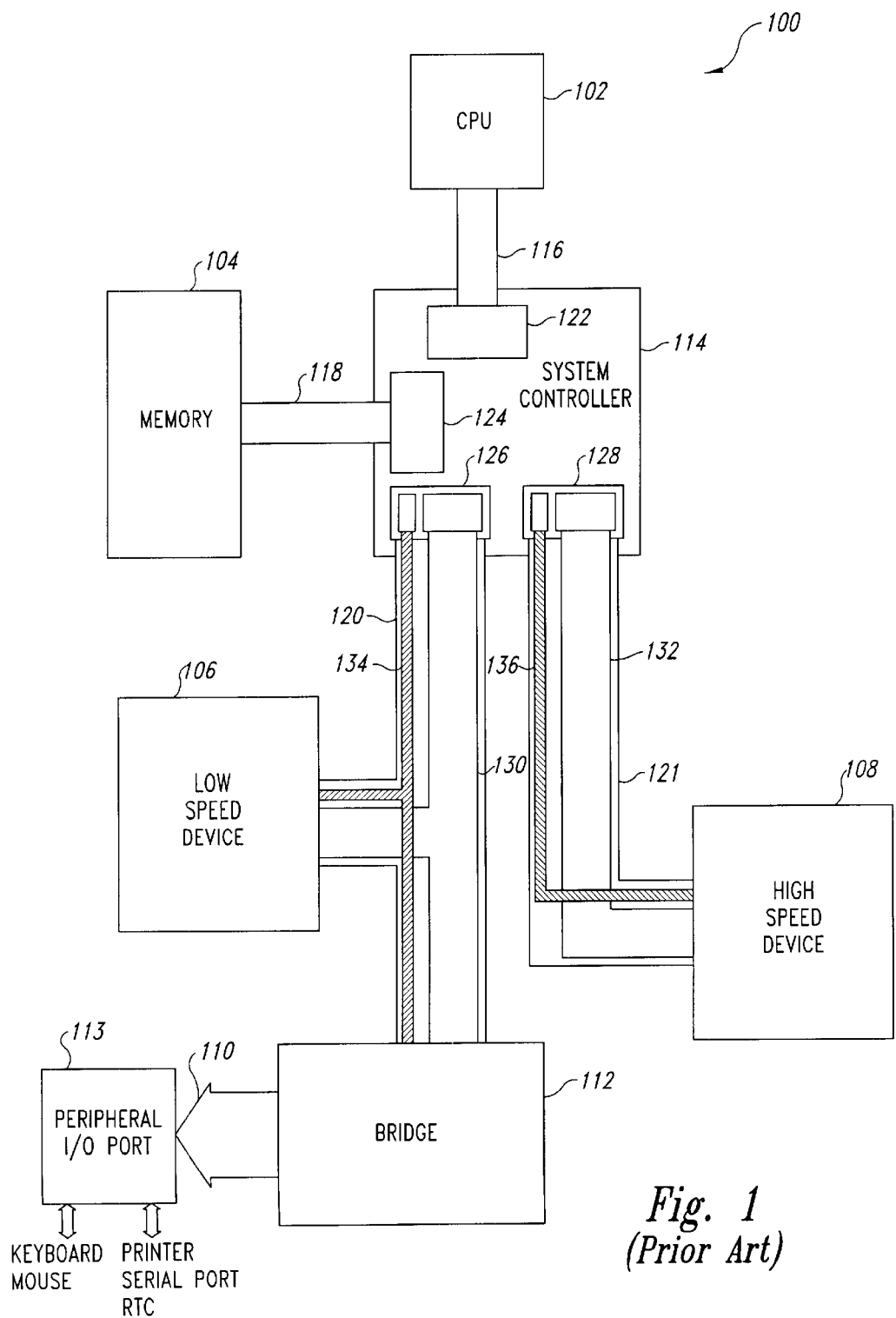
FIG. 1 is a block diagram of a commonly-employed bus architecture within currently-available PCs.
Figure 2:
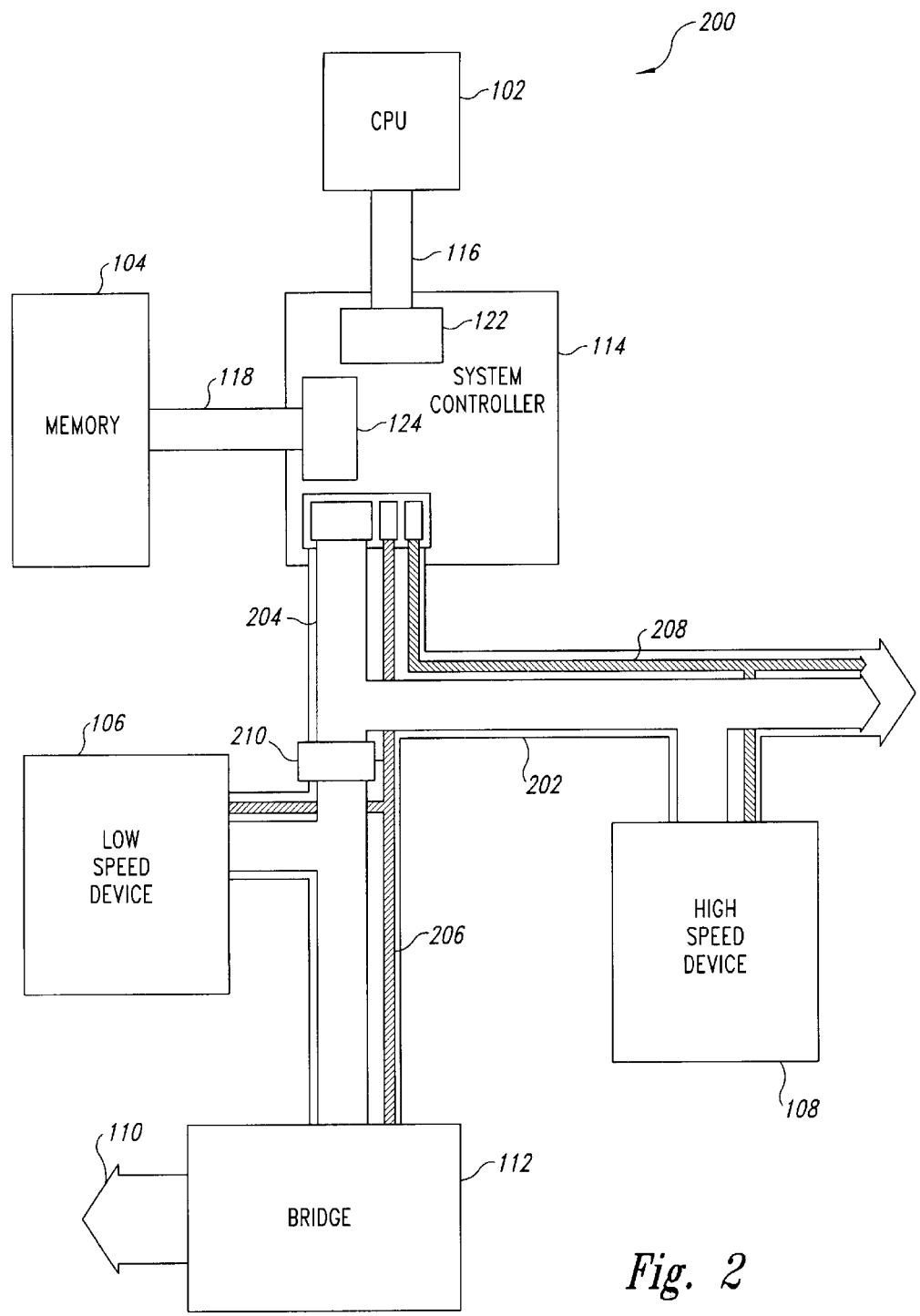
FIG. 2 is a block diagram of the bus architecture of a PC employing a single low-speed/high-speed time-multiplexed bus.

FIG. 2 is a block diagram of the bus architecture of a PC 200 employing a single low-speed/high-speed time-multiplexed bus ("LS/HS-B") 202. The majority of the components shown in FIG. 2 are identical to the components shown in FIG. 1. Thus, in the interest of brevity, those components of FIG. 2 that are identical to the components in FIG. 1 have been provided with the same reference numerals as in FIG. 1, and an explanation of their operation will not be repeated.

Whereas a conventional PC 100, as shown in FIG. 1, includes both a low-speed PCI bus 120 and a high-speed PCI or AGP bus 121, the PC 200 diagrammed in FIG. 2 contains a single LS/HS-B 202. The LS/HS-B 202 contains shared data, address, and control signal lines 204 as well as dedicated low-speed bus cycle control lines 206 and dedicated high-speed bus cycle control lines 208. The LS/HS-B 202 also contains a quick switch 210 which is used to electronically isolate the high capacitance low-speed devices 106 and 112 from the data/address lines and the shared control lines 204 of the LS/HS-B 202 when the LS/HS-B is operating at high speed.

When the LS/HS-B 202 is implemented for the PCI or PCI and AGP architectures, the dedicated bus cycle control lines 206 and 208 include the FRAME#, IRDY#, and TRDY# control lines. The FRAME#, or cycle frame signal indicates the start and duration of a transaction such as a read or write. The TRDY#, or target ready signal is asserted by a target device to indicate that the target device is ready to complete the current data phase of the operation. The IRDY#, or initiator ready signal is asserted by a device to indicate that the device is driving valid data onto the bus as part of an operation. These three signals thus comprise a handshake mechanism that allow an initiator device and a target device to begin and complete a data transfer operation. A PCI bus contains a number of other control signal lines, including the STOP#, LOCK#, IDSEL, and DEVSEL# signals. These additional control lines do not need to be duplicated for inclusion in the dedicated low-speed and high-speed control line sets within the LS/HS-B 202 because there is one of each of these additional control lines dedicated to each device connected to a PCI or AGP bus. Thus, the LS/HS-B 202 requires separate dedicated low-speed 206 and high-speed 208 signal line sets comprising only the control lines corresponding to the FRAME#, IRDY#, and TRDY# signals.

Consider the combination of a low-speed 64-bit PCI bus and a high-speed 64-bit PCI bus together into a single LS/HS-B. Conventional time multiplexing in both buses allows the 64 data lines to be physically coexistent with the 64 address lines. Each PCI bus has a total of 100 signal lines (64 address/data lines and 36 control lines) rather than 164 signal lines that would be required if conventional time multiplexing was not used for data transmission and addressing over shared data/address lines. By combining the low-speed PCI and the high-speed PCI together into a single LS/HS-B, the resulting LS/HS-B contains 103 discrete physical signal lines rather than the 200 signal lines that comprise the separate low-speed PCI and high-speed PCI buses. The number of pin connections required for the LS/HS-B bus interface thus only slightly exceeds one-half of the number of pin connections required for separate low-speed and high-speed buses. The LS/HS-B bus provides the same connectivity and nearly the same bandwidth that are provided by the two separate low-speed and high-speed buses.

Figure 3:
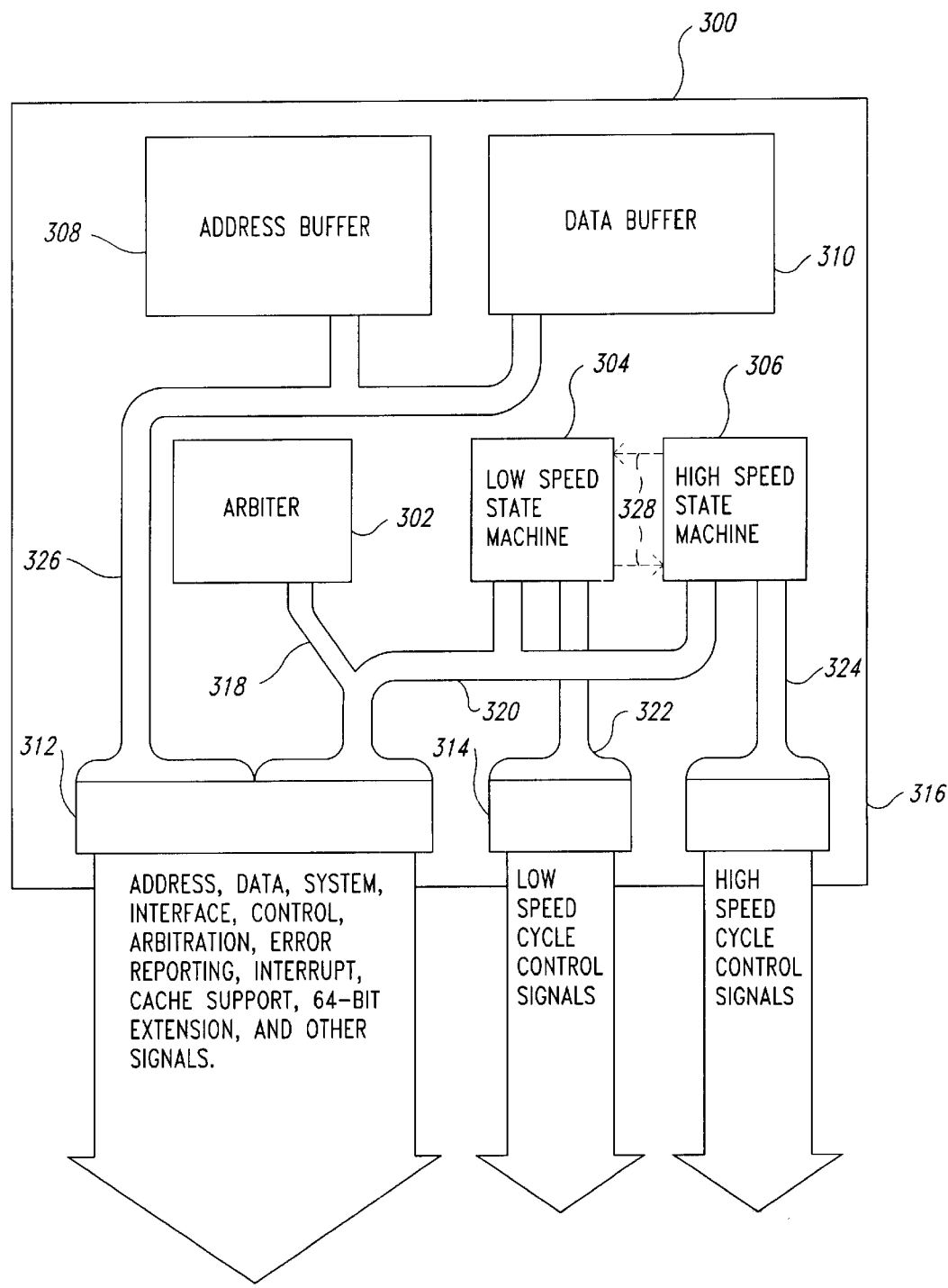
FIG. 3 is a block diagram of internal components of the low-speed/high-speed time-multiplexed bus interface.

FIG. 3 is a block diagram of internal components of the LS/HS-B bus interface 300. The LS/HS-B bus interface 300 contains an arbiter 302, a low-speed state machine 304, a high-speed state machine 306, an address buffer 308, a data buffer 310, pin connections for the shared signal lines 312, pin connections for the low-speed bus cycle control lines 314, and pin connections for the high-speed bus speed control lines 316. The arbiter 302 is connected to those control lines of the PCI bus 318 related to arbitration of bus usage for different devices. The arbiter 302 essentially fields competing requests for bus usage and allocates the bus to only one device at a time. The arbiter makes the low-speed state machine 304 active during low-speed bus operations, and makes the high-speed state machine 306 active during high-speed bus operations. The arbiter also isolates low-speed devices from the shared data/address lines of the bus by activating the quick switch 210. The low-speed and high-speed state machines 304, 306, respectively, are each connected to a portion of the shared control signal lines 320. The low-speed state machine 304 is, in addition, connected through a bus 322 to the low-speed bus cycle control signals 314, and the high-speed state machine 306 is, in addition, connected through a bus 324 to the high-speed bus cycle control signals 316. The low-speed state machine 304 controls the sequencing of control signals during low-speed bus operations and the high-speed state machine 306 controls sequencing of the control signals during high-speed bus operations. The LS/HS-B bus interface 300 contains both an address buffer 308 and a data buffer 310. These buffers are shared during both low-speed and high-speed operations. As an alternative implementation, the LS/HS-B bus interface 300 may contain separate address and data buffers (not shown) for low-speed operations and for high-speed operations. The address and data buffers 308 and 310 are connected to the data and address lines 326. A conventional PCI bus interface 300 contains an arbiter, a state machine, and address and data buffers. The LS/HS-B bus interface 300 differs from a conventional PCI bus interface primarily in having two state machines 304 and 306 rather than a single, conventional state machine.

A special problem arises when data is transferred between a low-speed device 106 and a high-speed device 108. Although such an operation generally occurs infrequently, the LS/HS-B bus 202 must conceptionally be either in a high-speed or in a low-speed mode at any single time. In one preferred implementation, the LS/HS-B bus 202 operates at the bus speed of the device providing data, fetches that data and places the data into a buffer (not shown) within the LS/HS-B bus interface 300. The LS/HS-B bus 202 then transitions to the speed of the device that receives the data during the operation and transfers the data from the buffer to that device while operating at the speed required by that device.

Although the present invention has been described in terms of one embodiment, it is not intended that the invention be limited to this embodiment. Modification within the spirit of the invention will be apparent to those skilled in the art. For example, as noted above, low-speed and high-speed versions of a large variety of different types of buses may be combined together to form a single physical bus with multiplexed low-speed and high-speed operations. As another example, different components and combinations of components can be used to implement the functions of the components shown in FIG. 3 within the buffer interface of a low-speed/high-speed time-multiplexed bus. In different types of bus architectures, a different number of bus cycle control signals may need to be provided in redundant, dedicated low-speed and high-speed sets. Low-speed/high-speed time multiplexing can be implemented without implementing conventional time multiplexing or, in other words, the data and address lines need not be physically coexistent in a low-speed/high-speed time-multiplexed bus. The scope of the present invention is defined by the claims that follow.

What is claimed is:

1. A time-multiplexed multi-speed communications bus comprising:

a number of high-speed signal lines that are operated only at high speed;

a number of low-speed signal lines that are operated only at low speed;

a number of multi-speed signal lines that are operated at low speed together with the low-speed signal lines and at high speed together with the high-speed signal lines;

at least one low-speed device connected to the multi-speed signal lines and to the low-speed signal lines, the time-multiplexed multi-speed bus operating at low speed to carry out a bus operation when one of the low-speed devices initiates the bus operation with another one of the low-speed devices;

at least one high-speed device connected to the multi-speed signal lines and to the high-speed signal lines, the time-multiplexed multi-speed bus operating at high speed to carry out a bus operation when one of the high-speed devices initiates the bus operation with another one of the high-speed devices; and when a bus operation between one of the low-speed devices and one of the high-speed devices is initiated, during the portion of the bus operation in which data is transmitted by a device, the time-multiplexed multi-speed bus operates at the speed required by the device that transmits data for the operation, and during the portion of the bus operation in which data is received by a device, the time-multiplexed multi-speed bus operates at the speed required by the device that receives the data.

2. The time-multiplexed multi-speed communications bus of claim 1 further comprising:

an arbiter that detects a speed of a device that initiates a bus operation;

a low-speed state machine that, when the detected device speed is low, is activated by the arbiter to control the sequencing of signal propagation over the signal times during an initial portion of the execution of the bus operation; and a high-speed state machine that, when the detected device speed is high, is activated by the arbiter to control the sequencing of signal propagation over the signal lines during an initial portion of the execution of the bus operation.

3. The time-multiplexed multi-speed communications bus of claim 2 further comprising a data buffer that stores data transmitted to the time-multiplexed multi-speed communications bus during a bus operation between a low-speed and a high-speed device until the data is subsequently transmitted to the device that receives the data as a result of the bus operation.

4. The time-multiplexed multi-speed communications bus of claim 2 wherein, when a bus operation between a low-speed and a high-speed device is initiated, operation of the low-speed state machine is synchronized and interleaved with operation of the high-speed state machine so that transmission of the data to the time-multiplexed multi-speed communications bus by the device that transmits data for the operation is controlled by the state machine that corresponds in speed to the device that transmits data for the operation, after which the state machine that corresponds in speed to the device that receives data as a result of the bus operation controls completion of the bus operation.

5. The time-multiplexed multi-speed communications bus of claim 3 further including an address buffer, the data buffer and the address buffer shared during execution of bus operations at both low speed and high speed.

6. The time-multiplexed multi-speed communications bus of claim 2 further comprising a low-speed data buffer, a high-speed data buffer, a low-speed address buffer, and a high-speed address buffer, wherein the low-speed data buffer and the low-speed address buffer are used during execution of bus operations at low speed and wherein the high-speed data buffer and the high-speed address buffer are used during execution of bus operations at high speed.

7. The time-multiplexed multi-speed communications bus of claim 2 supporting 33 megahertz PCI bus operations and 66 megahertz PCI bus operations wherein the low-speed and high-speed sets of signal lines each comprise FRAME#, IRDY#, and TRDY# signal lines.

8. The time-multiplexed multi-speed communications bus of claim 2 supporting 33 megahertz PCI bus operations and 133 megahertz AGP bus operations wherein the dedicated low-speed and dedicated high-speed sets of signal lines each comprise FRAME#, IRDY#, and TRDY# signal lines.

9. The time-multiplexed multi-speed communications bus of claim 2 further comprising a switch that controls propagation of signals via the multi-speed signal lines that is activated by the arbiter during high-speed operations to electrically isolate the low-speed devices from the multi-speed signal lines.

10. A system controller with a number of pin connectors for connecting the system controller to a multi-speed bus that connects the system controller to peripheral devices in a computer system, the system controller comprising:

pin connectors to multi-speed bus lines and to a small number of low-speed bus lines and to a small number of high-speed bus lines;

a low-speed state machine that controls propagation of signals over the multi-speed and low-speed bus lines;

a high-speed state machine that controls propagation of signals over the multi-speed and high-speed bus lines; and an arbiter that detects the speed of a device initiating a bus operation and, when the initiating device is a low-speed device, activates the low-speed state machine, and, when the initiating device is a high-speed device, activates the high-speed state machine, and, when a bus operation between a low-speed and a high-speed peripheral device is initiated:

the arbiter first activates the state machine corresponding in speed to the peripheral device that transmits data for the operation in order to operate the multi-speed bus at the speed required by the peripheral device that transmits data for the operation, the peripheral device that transmits data for the operation then transmits data to the multi-speed bus, the arbiter next activates the state machine corresponding in speed to the peripheral device that receives data as a result of the bus operation in order to operate the physical bus at the speed required by the peripheral device that receives data as a result of the bus operation, and the data is then transmitted to the peripheral device that receives data as a result of the bus operation.

11. The system controller of claim 10 wherein the multi-speed bus supports 33 megahertz PCI bus operations and 133 megahertz AGP bus operations.

12. The system controller of claim 11 wherein the multi-speed bus supports 33 megahertz PCI bus operations and 66 megahertz PCI bus operations.

13. The system controller of claim 10 further comprising a data buffer that, when a bus operation between a low-speed and a high-speed peripheral device has been initiated and data has been transmitted to the multi-speed bus by the peripheral device that transmits data for the operation, stores the transmitted data until the data is subsequently transmitted to the peripheral device that receives data as a result of the bus operation.

14. The system controller of claim 10 wherein, when a bus operation between a low-speed and a high-speed peripheral device is initiated, operation of the low-speed state machine is synchronized and interleaved with operation of the high-speed state machine so that transmission of the data to the multi-speed bus by the peripheral device that transmits data for the operation is controlled by the state machine that corresponds in speed to the peripheral device that transmits data for the operation after which the state machine that corresponds in speed to the peripheral device that receives data as a result of the bus operation controls completion of the bus operation.

15. The system controller of claim 13 further comprising an address buffer, the data buffer and address buffer shared during execution of bus operations at both low speed and high speed.

16. The system controller of claim 10 further comprising a low-speed data buffer, a high-speed data buffer, a low-speed address buffer, and a high-speed address buffer wherein the low-speed data buffer and the low-speed address buffer are used during execution of bus operations at low speed and the high-speed data buffer and the high-speed address buffer are used during execution of bus operations at high speed.

17. The system controller of claim 10 wherein the small number of low-speed bus lines and the small number of high-speed bus lines each comprise FRAME#, IRDY#, and TRDY# signal lines.

18. A multi-speed bus for communicating between a system controller and a high-speed device and between a system controller and a low-speed device, one of the devices communication with another of the devices via the multi-speed bus and system controller by initiating a bus operation, the multi-speed bus comprising:
a first set of the bus lines and a second set of the bus lines, the bus lines in the first set being different from the bus lines in the second set, the first and second sets of bus lines being used for high-speed bus operations between the system controller and the high-speed device, the first set and second set of bus lines operating at high speed to carry out the bus operation when a high-speed device initiates a bus operation with another high-speed device, the first set and second set of bus lines operating at high speed to transmit the data to the system controller when the high-speed device transmits data as part of a bus operation with one of the low-speed devices, and the first set and the second set of bus lines operating at high speed to transmit the data from the system controller to the high-speed device when the high-speed device receives data as part of a bus operation with one of the low-speed devices; and
a third set of the bus lines, the bus lines in the third set being different from the bus lines in the first set, the first and third sets of bus lines being used for low-speed bus operations between the system controller and the low-speed device, the first set and third set of bus lines operating at low speed to carry out the bus operation when a low-speed device initiates a bus operation with another low-speed device, the first set and the third set of bus lines operating at low speed to transmit the data to the system controller when the low-speed device transmits data as part of a bus operation with one of the high-speed devices, and the first set and the third set of bus lines operating at low speed to transmit the data from the system controller to the low-speed device when the low-speed device receives data as part of a bus operation with one of the high-speed devices.

19. The multi-speed bus of claim 18 further including:
an arbiter that detects a speed of a device that initiates a bus operation;
a low-speed state machine that, when the detected device speed is low, is activated by the arbiter to control the sequencing of signal propagation over the signal lines during an initial portion of the execution of the bus operation; and
a high-speed state machine that, when the detected device speed is high, is activated by the arbiter to control the sequencing of signal propagation over the signal lines during an initial portion of the execution of the bus operation.

20. The multi-speed bus of claim 19 further comprising a data buffer that stores data transmitted to the time-multiplexed multi-speed bus during a bus operation between a low-speed and a high-speed device until the data is subsequently transmitted to the device that receives the data as a result of the bus operation.

21. The multi-speed bus of claim 19 wherein, when a bus operation between a low-speed and a high-speed device is initiated, operation of the low-speed state machine is synchronized and interleaved with operation of the high-speed state machine so that transmission of the data to the multi-speed bus by the device that transmits data for the operation is controlled by the state machine that corresponds in speed to the device that transmits data for the operation after which the state machine that corresponds in speed to the device that receives data as a result of the bus operation controls completion of the bus operation.

22. The multi-speed bus of claim 20 further including an address buffer, the data buffer and the address buffer shared during execution of bus operations at both low speed and high speed.

23. The multi-speed bus of claim 20 further comprising a low-speed data buffer, a high-speed data buffer, a low-speed address buffer, and a high-speed address buffer wherein the low-speed data buffer and the low-speed address buffer are used during execution of bus operations at low speed and wherein the high-speed data buffer and the high-speed address buffer are used during execution of bus operations at high speed.

24. The multi-speed bug of claim 19 supporting 33 megahertz PCI bus operations and 66 megahertz PCI bus operations wherein the low-speed and high-speed sets of signal lines each comprise FRAME#, IRDY#, and TRDY# signal lines.

25. The multi-speed bus of claim 19 supporting 33 megahertz PCI bus operations and 133 megahertz AGP bus operations wherein the dedicated low-speed and dedicated high-speed sets of signal lines each comprise FRAME#, IRDY#, and TRDY# signal lines.

26. The multi-speed bus of claim 19 further comprising a switch that controls propagation of signals via the first set of bus lines that is activated by the arbiter during high-speed operations to electrically isolate the low-speed devices from the first set of bus lines.

27. A bus for communicating between a central communications device and a high-speed device and between the central communications device and a low-speed device by initiating a bus operation, the bus comprising:

a set of bus lines that are shared by the high-speed device and the low-speed device for communicating between the central communications device and the low-speed device and between the central communications device and the high-speed device;

a set of high-speed bus lines that operate only at high speed for communicating between the central communications device and the high-speed device; and a set of low-speed bus lines that operate only at low speed for communicating between the central communications device and the low-speed device, wherein:

when a low-speed device initiates a bus operation with another low-speed device, the shared bus lines and the low-speed set of bus lines operate to carry out the bus operation;

when a high-speed device initiates a bus operation with another high-speed device, the shared bus lines and the high-speed set of bus lines operate at high speed to carry out the bus operation; and when a bus operation between a low-speed and a high-speed device is initiated, when the low-speed device transmits data as part of the bus operation, the shared bus lines and the low-speed set of bus lines operate at low speed to transmit the data to the central communications device;

when the high-speed device transmits data as part of the bus operation, the shared bus lines and the high-speed set of bus lines operate at high speed to transmit the data to the central communications device;

when the low-speed device receives data as part of the bus operation, the shared bus lines and the low-speed set of bus lines operate at low speed to transmit the data from the central communications device to the low-speed device; and when the high-speed device receives data as part of the bus operation, the shared bus lines and the high-speed set of bus lines operate at high speed to transmitting the data from the central communications device to the high-speed device.

28. The bus of claim 27 wherein the central communications device includes:

a low-speed state machine that controls the sequencing of signal propagation over the bus lines during an initial portion of the execution of the bus operation at low speed;

a high-speed state machine that control the sequencing of signal propagation over the bus lines during an initial portion of the execution of the bus operation at high speed; and an arbiter that detects a speed of a device that initiates a bus operation and, when the detected device speed is low, activates the low-speed state machine to control the sequencing of signal propagation and, when the detected device speed is high, activates the high-speed state machine to control the sequencing of signal propagation over the bus lines.

29. The bus of claim 28 further including a data buffer that, when a bus operation between a low-speed and a high-speed device is initiated and data is transmitted to the central communications device by the device that transmits data for the operation, stores the transmitted data and that subsequently provides the data following activation of the state machine that corresponds in speed to the device that receives data as a result of the bus operation by the arbiter for transmission over bus lines to the device that receives data as a result of the bus operation.

30. The bus of claim 28 wherein, when a bus operation between a low-speed and a high-speed device is initiated, operation of the low-speed state machine is synchronized and interleaved with operation of the high-speed state machine so that transmission of the data via the bus by the device that transmits data for the operation is controlled by the state machine that corresponds in speed to the device that transmits data for the operation after which the state machine that corresponds in speed to the device that receives data as a result of the bus operation controls completion of the bus operation.

31. The method of claim 28 wherein the central communications device includes a data buffer and an address buffer that are shared during execution of bus operations at both low speed and high speed.

32. The method of claim 28 wherein the central communications device includes a low-speed data buffer, a high-speed data buffer, a low-speed address buffer, and a high-speed address buffer wherein the low-speed data buffer and the low-speed address buffer are used during execution of bus operations at low speed and wherein the high-speed data buffer and the high-speed address buffer are used during execution of bus operations at high speed.

33. The bus of claim 28 supporting 33 megahertz PCI bus operations and 66 megahertz PCI bus operations wherein the low-speed and high-speed sets of bus lines each comprise FRAME#, IRDY#, and TRDY# bus lines.

34. The bus of claim 28 supporting 33 megahertz PCI bus operations and 133 megahertz AGP bus operations and wherein the low-speed and the high-speed sets of bus lines each comprise FRAME#, IRDY#, and TRDY# bus lines.

35. The bus of claim 28 further including a switch that controls propagation of signals via the shared set of bus lines and that is activated by the arbiter to electrically isolate the low-speed devices from the shared set of bus lines during high-speed operations.

* * * * *

UNITED STATES PATENT AND TRADEMARK OFFICE
CERTIFICATE OF CORRECTION

PATENT NO.    : 6,425,041 B1
DATED         : July 23, 2002
INVENTOR(S)   : Dean A. Klein It is certified that error appears in the above-identified patent and that said Letters Patent is hereby corrected as shown below:

Column 1,
Line 67, "Modem computer systems," should read -- Modern computer systems, --

Column 6,
Line 20, "the quick switch 210" should read -- the quickswitch 210 --

Column 7,
Line 48, "over the signal times" should read -- over the signal lines --

Column 10,
Line 59, "The multi-speed bug" should read -- The multi-speed bus --

Signed and Sealed this

First Day of July, 2003

JAMES E. ROGAN
*Director of the United States Patent and Trademark Office*